Howard R. DeMallie
James F. Worden
INVENTORS

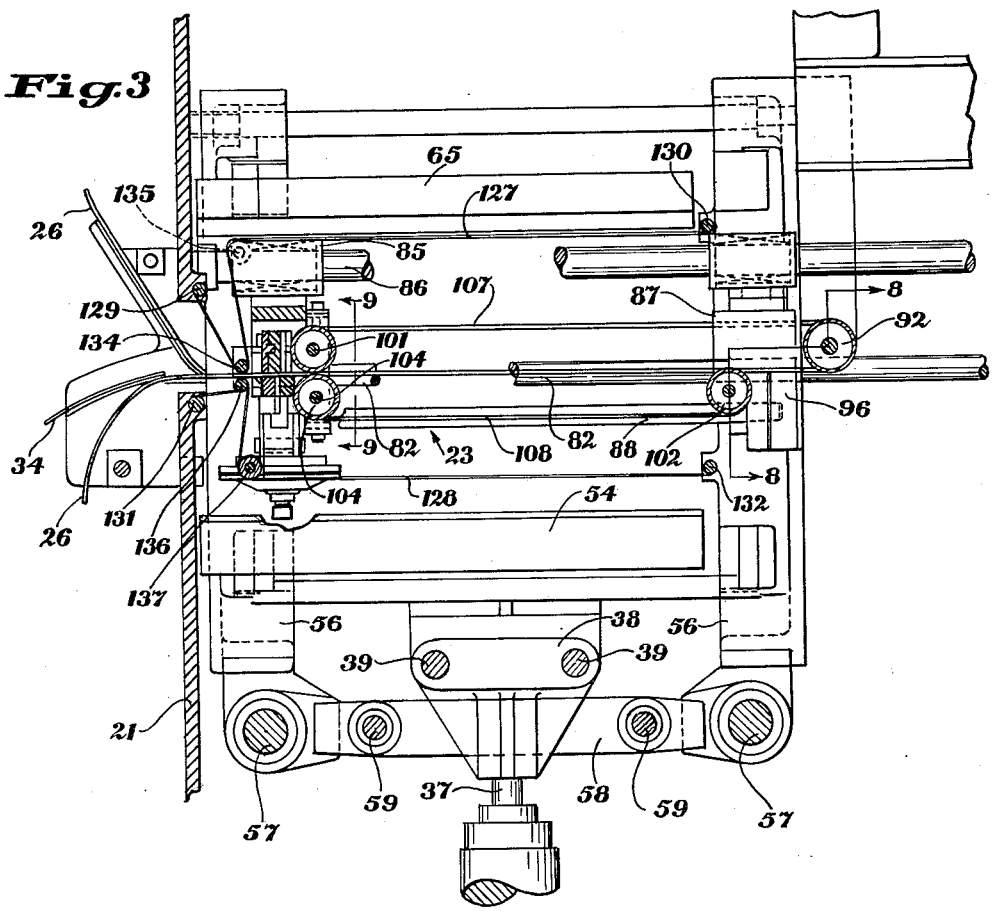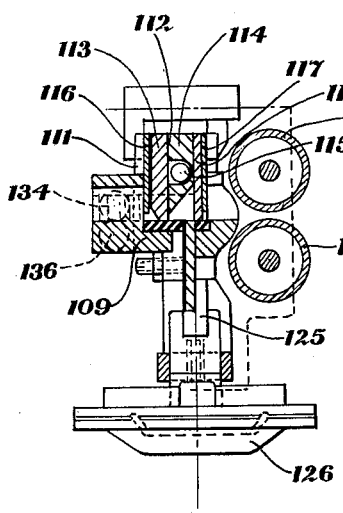
Howard R. DeMallie
James F. Worden
INVENTORS

Feb. 11, 1964 H. R. DE MALLIE ETAL 3,120,726
SHEET PACKAGING MACHINE
Filed Nov. 18, 1960 12 Sheets-Sheet 4
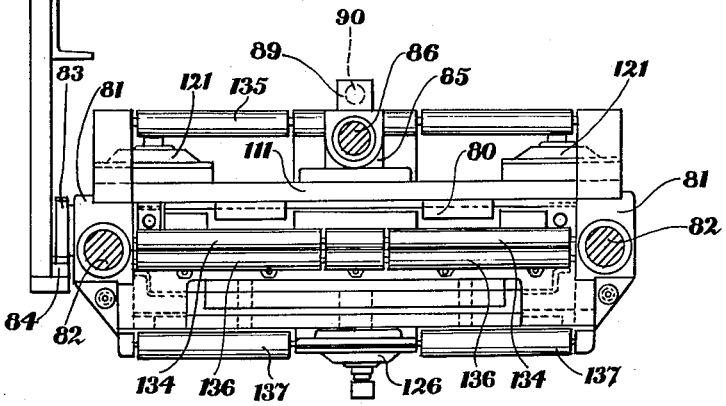
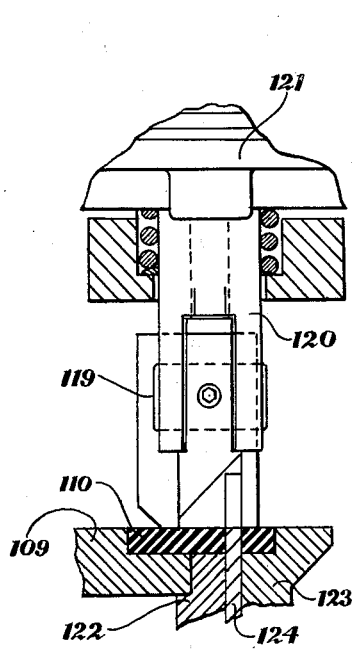
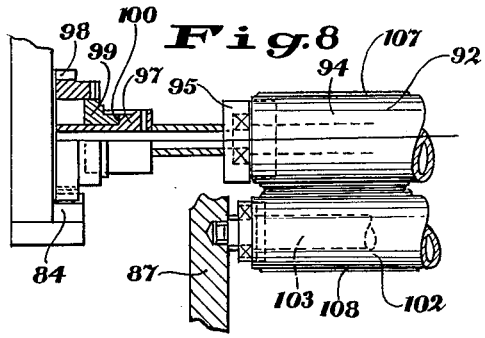
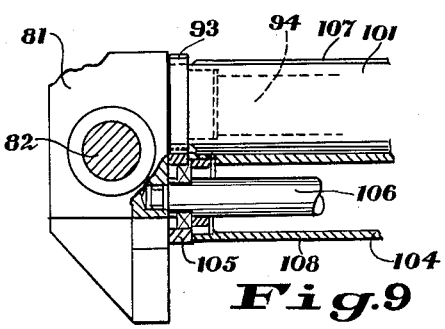
Howard R. DeMallie
James F. Worden
INVENTORS
BY R. Frank Smith
Steve W. Grembaw
ATTORNEYS

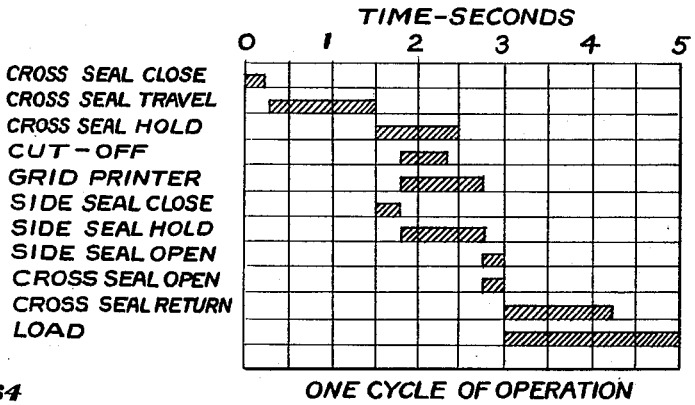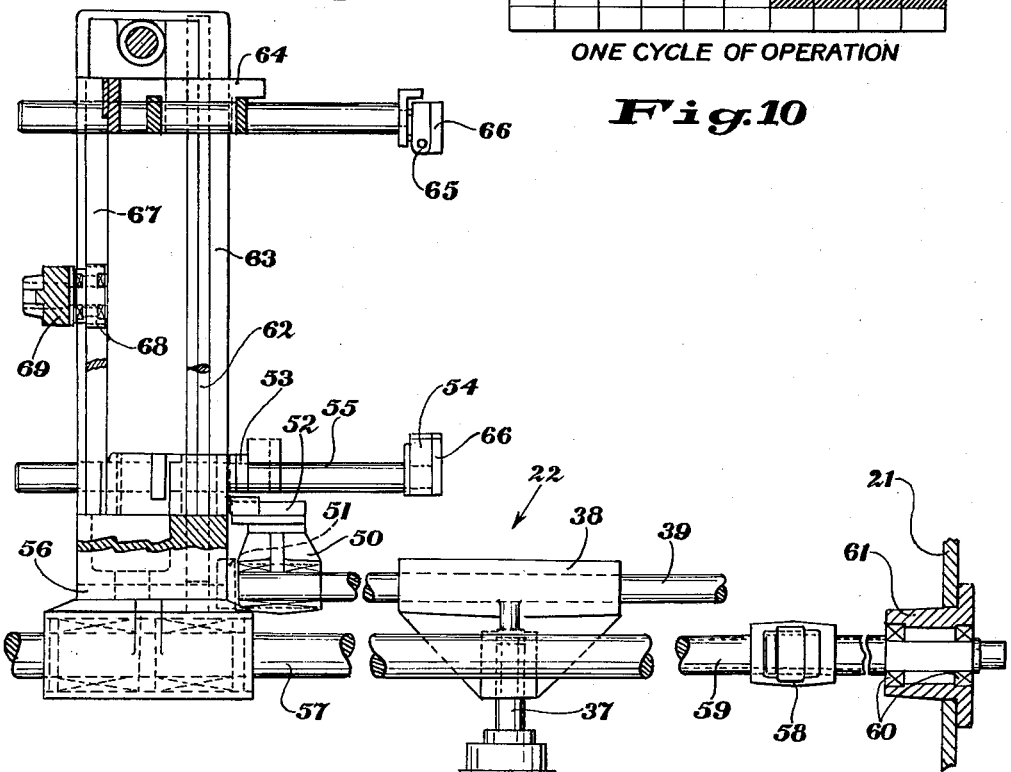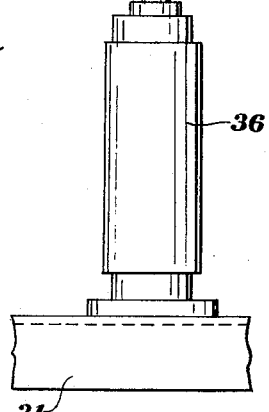

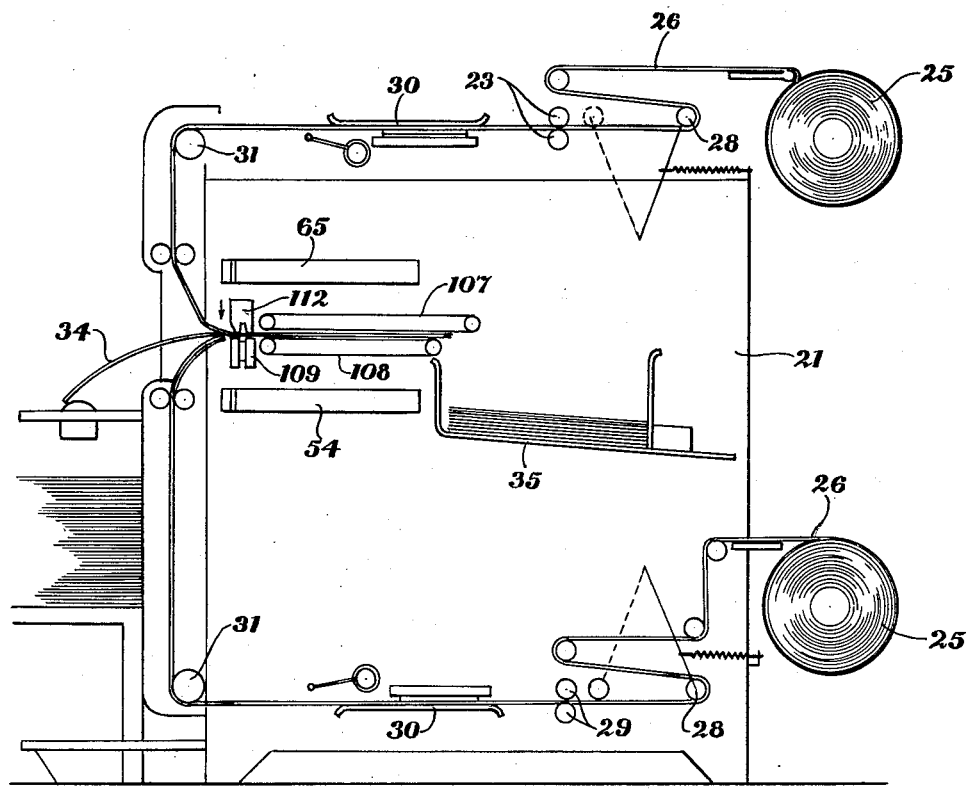

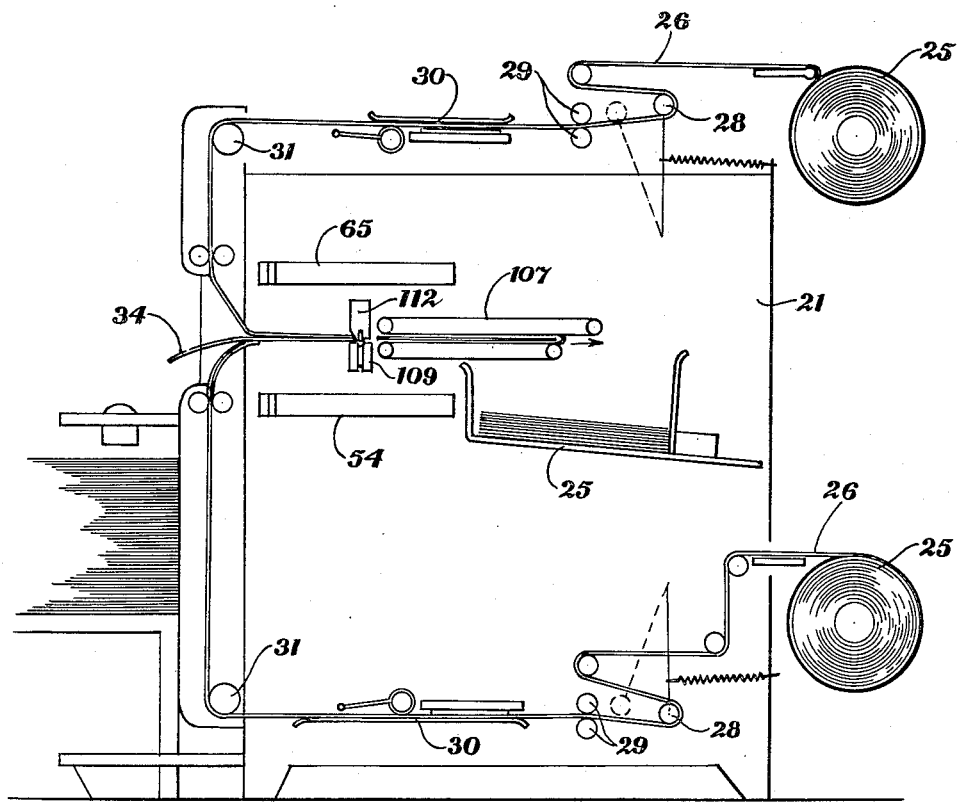

Feb. 11, 1964  H. R. DE MALLIE ETAL  3,120,726
SHEET PACKAGING MACHINE
Filed Nov. 18, 1960  12 Sheets-Sheet 8
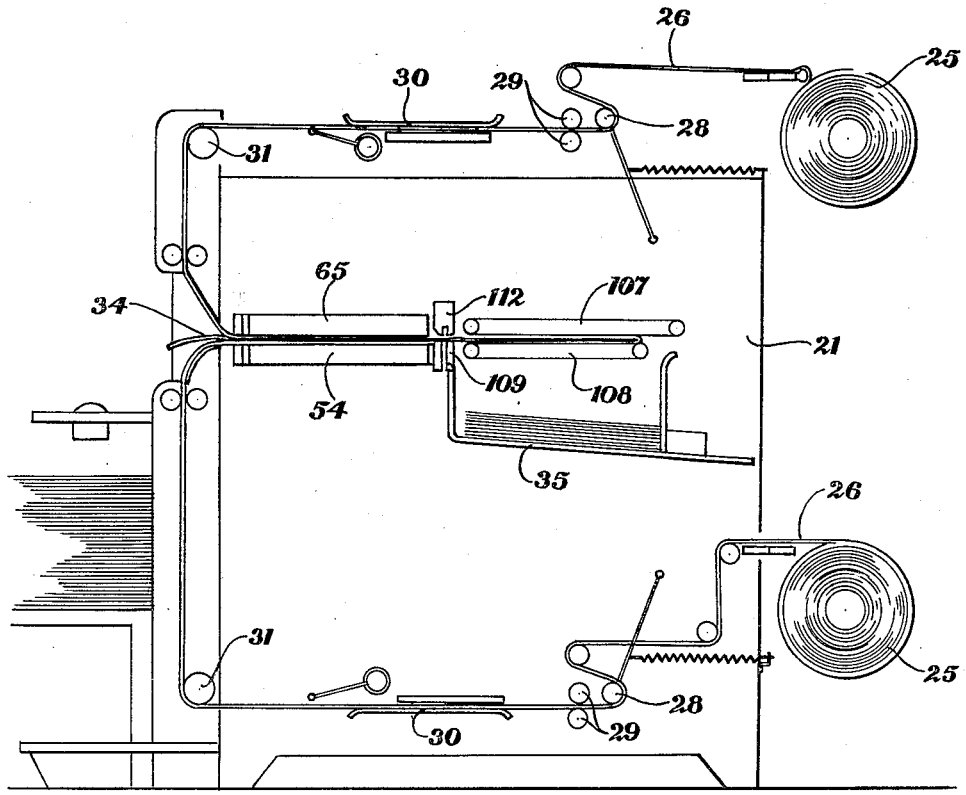
Howard R. DeMallie
James F. Worden
INVENTORS
BY R. Frank Smith
Steve W. Grenbaw
ATTORNEYS Feb. 11, 1964   H. R. DE MALLIE ETAL   3,120,726
SHEET PACKAGING MACHINE
Filed Nov. 18, 1960   12 Sheets-Sheet 10

Howard R. De Mallie
James F. Worden
INVENTORS

BY
ATTORNEYS

Feb. 11, 1964    H. R. DE MALLIE ETAL    3,120,726
SHEET PACKAGING MACHINE
Filed Nov. 18, 1960    12 Sheets-Sheet 12

Howard R. DeMallie
James F. Worden
INVENTORS
BY
ATTORNEYS

United States Patent Office 3,120,726
Patented Feb. 11, 1964

3,120,726
SHEET PACKAGING MACHINE
Howard R. De Mallie and James F. Worden, Rochester, N.Y., assignors to Eastman Kodak Company, Rochester, N.Y., a corporation of New Jersey
Filed Nov. 18, 1960, Ser. No. 70,191
19 Claims. (Cl. 53—28)

This invention relates generally to packaging machines, and more specifically to an improved machine for packaging discrete sheets.

In the production of X-ray film for medical use, the film is interposed between two webs of heat-sealable coated paper and the webs sealed along the edges of the film to form a light-tight package. The packaged film may then be stored for subsequent or future use. This invention involves an improved machine for packaging discrete sheets of film or the like.

One of the primary objects of the present invention is to provide an improved machine for packaging discrete sheets of film or the like.

Another object of the present invention is to provide an improved packaging machine of simple deisgn and construction, thoroughly reliable and efficient in operation, and economical to manufacture.

A more specific object of the invention is the provision of an improved packaging machine in which a discrete sheet of film or the like is fed between two webs of heat-sealable coated paper and the webs sealed along the edges of the film to form a light-tight package.

Still another object of this invention is to provide an improved packaging machine for discrete sheets of film or the like including means for effectively squeezing out trapped air from the package before it is completely sealed.

Another object of the invention is to provide an improved packaging machine for discrete sheets of film or the like in which the sealing operations occur in timed sequence to partially seal one package and finish seal the package immediately preceding it.

Objects and advantages other than those set forth above will be apparent from the following description when read in connection with the accompanying drawings, in which:

FIG. 3 is an enlarged segmental view in section of a portion of the packaging machine of FIG. 1;

FIG. 4 is an enlarged side elevation view, partially in section, of a portion of the structure of FIG. 3 and showing one of the sealing mechanisms and omitting the remaining structure of the packaging machine for purposes of clarity;

FIG. 5 is a front elevation view of the sealing mechanism of FIG. 4;

FIG. 6 is an enlarged segmental view of a portion of the sealing mechanism of FIG. 4;

FIG. 7 is an enlarged segmental view of the other sealing mechanism shown in FIG. 3;

FIG. 8 is a segmental view in section taken along line 8—8 of FIG. 3;

FIG. 9 is a segmental elevation view partly in section of a portion of the structure of FIG. 3 when viewed from line 9—9;

FIG. 10 is a timing sequence chart for the packaging machine showing the operations performed, the sequence in which the operations are performed, and the approximate time allowed for each operation;

FIGS. 11–15 are diagrammatic views showing progressive positions of the packaging machine as it progresses through a complete cycle of operation;

Figure 1:
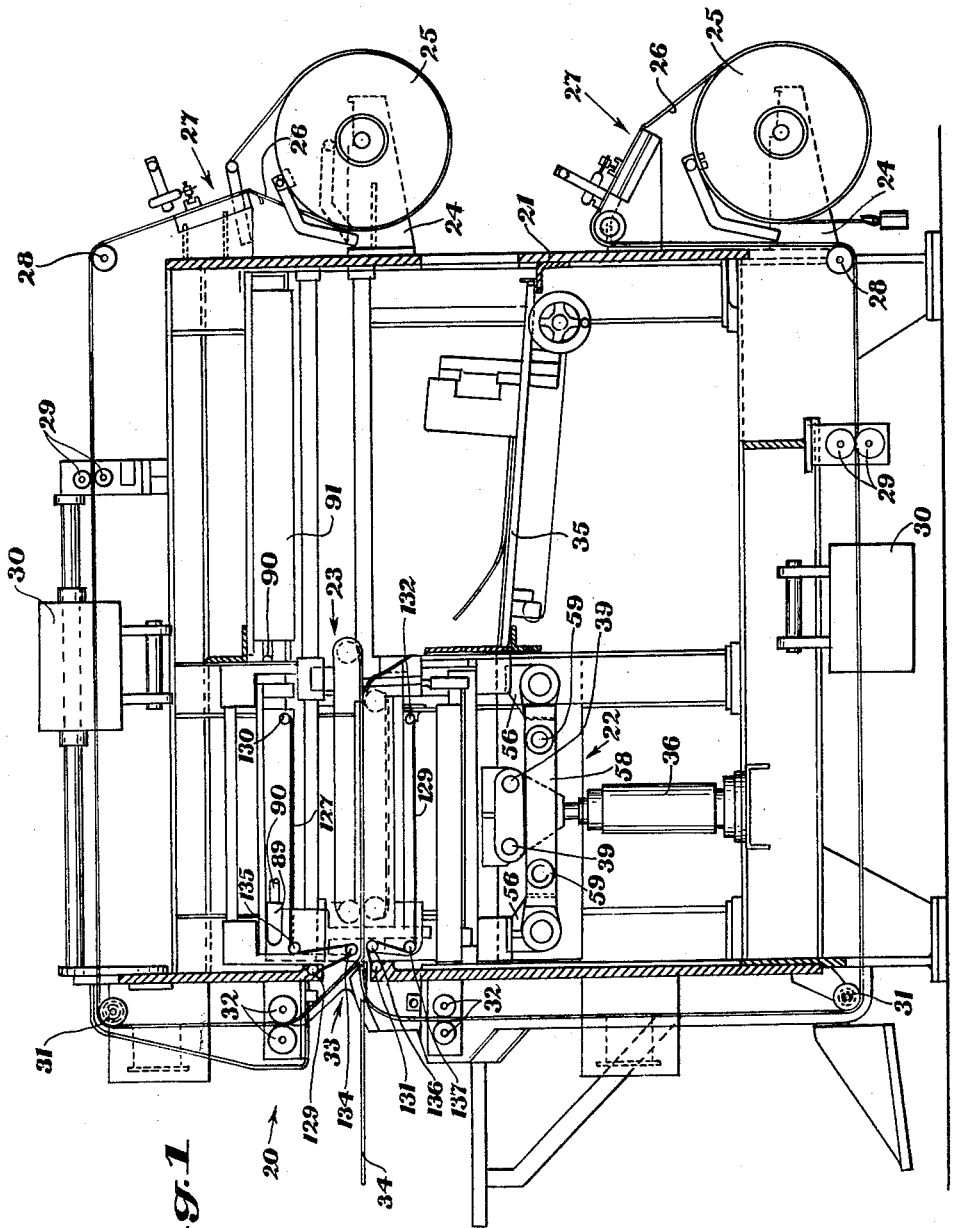
FIG. 1 is a side elevation view in section of a preferred embodiment of the packaging machine of this invention.

As shown in the drawings, a packaging machine 20 is disclosed comprising a rectangular frame 21 for supporting a vertically reciprocally movable side-seal mechanism 22 and a horizontally reciprocally movable cross-seal and transport mechanism 23. The rear end of frame 21 has a pair of spaced arms 24 secured thereto for rotatably supporting rolls 25 of paper stock within which the film or the like is to be packaged. The paper may be of any known type, although in the packaging of X-ray film a yellow kraft paper is preferred coated with a black latex material for opacity, and some suitable coating to promote heat-sealing. The webs 26 of paper stock pass over a splicing mechanism 27 of any known type having upper and lower splice boards separated by a groove along which a knife may be drawn for trimming the ends of paper webs which are to be spliced, and a clamping device for clamping the webs to the splicing mechanism. Each of the webs 26 further pass over guide rollers 28, pinch rollers 29, a printing head 30 of well-known construction for imprinting certain indicia on the outer surface of web 26, around another guide roller 31 for changing the direction of web 26, through another pair of pinch rollers 32 and through an entrance slot 33 in the front end of frame 21 into position for engagement by transport mechanism 23. A sheet 34 of material which is to be packaged, such as X-ray film or the like, is fed into the entrance slot of the machine between the webs 26 which are transported in superposed relation through machine 20 by transport mechanism 23. The sealing mechanisms 22, 23 seal the web 26 together along the sides and ends of sheet 34 in such a way as to totally enclose the sheet. The packaged sheet 34 is then severed from the webs 26 and is deposited by mechanism 23 into a storage bin 35. The splicing and printing mechanisms 27, 30 have been referred to only generally and will not be described in detail since they are environmental only and do not form a part of the invention.

Figure 2:
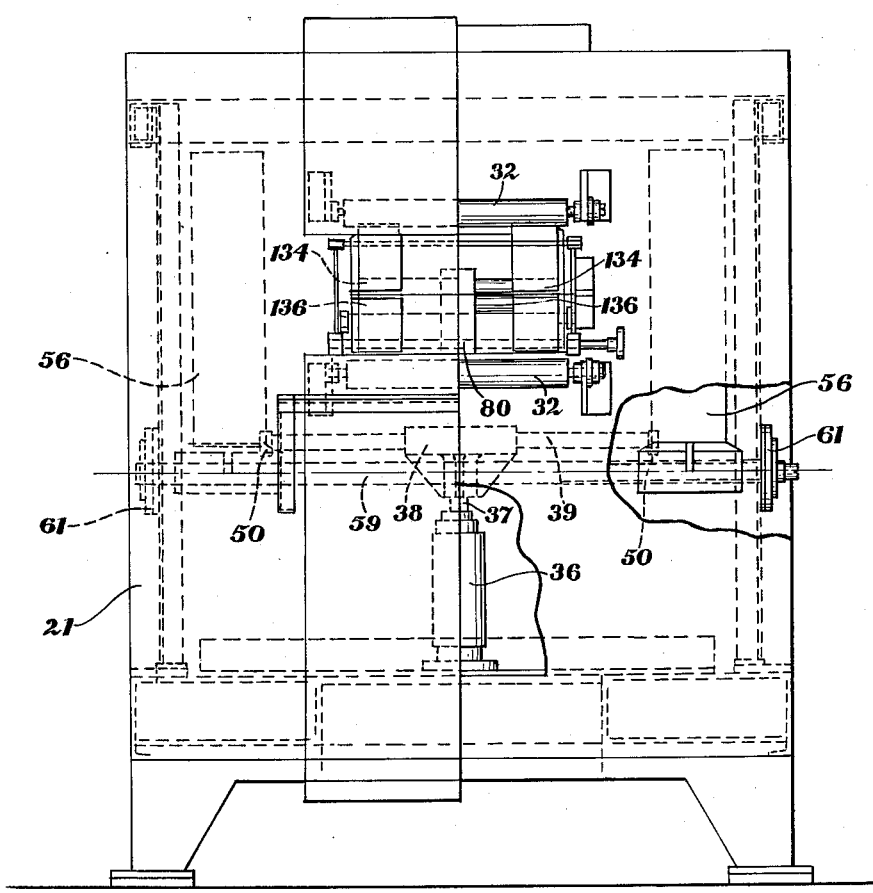
FIG. 2 is a front elevation view of the packaging machine of FIG. 1.
Figure 14:
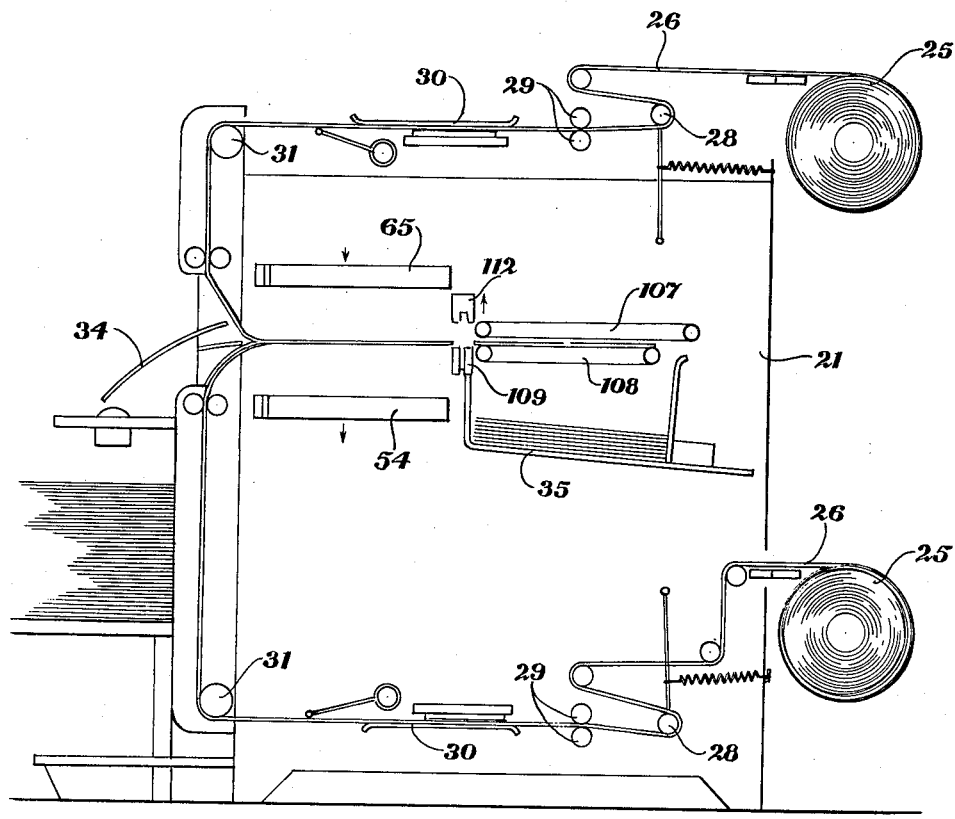

The above-mentioned side-seal mechanism 22 as seen best in FIG. 7 comprises an air cylinder 36 secured to the base of frame 21, and a reciprocally movable piston rod 37 secured to a bracket 38 which supports a pair of lift rods 39 seen in FIG. 1 passing therethrough. A pair of support brackets 50 as seen in FIG. 2 have bushings through which the ends of lift rods 39 extend, and each bracket 50 is retained on its lift rod 39 by means of a collar 51 as seen in FIG. 7. A rectangular lift plate 52 is secured to each bracket 50 and is adapted to engage a pair of spaced apart base members 53 which slidably support spaced apart lower elongated side-seal bars 54, only one of which is shown on rods 55. Bars 54 are of substantially rectangular cross-section, having a web engaging side and a resistance heating element, not shown, embedded therein and are adapted to apply both heat and pressure to webs 26. Each base member 53 is supported by a housing 56 which is slidably mounted on rods 57, and side-seal bars 54 are axially movable to adjustably vary the distance between the side-seal bars for accommodating material and paper webs of different widths. The bars 54 are movable by means of arms 58, only one of which is shown in FIG. 3, slidably supported by shafts 59, 59' one of which has a left hand thread at one end and a right hand thread at the other end. The threaded shaft 59 is rotatably mounted in bearings 60 supported by a housing 61, seen in FIGS. 2 and 7 secured to frame 21.

The square end 60 of shaft 59 is adapted to receive a crank, not shown, which, when turned, rotates threaded shaft 59 for axially moving arms 58 in opposite directions one way or the other depending upon the direction of rotation of shaft 59. The ends of arms 58 are insertable in grooves formed by housings 56 for coupling housings 56 and arms 58 together so that movement of arms 58 are transmitted to housings 56, base members 53 and side-seal bars 54. Each base member 53 is guided for movement in a vertical direction by means of guide rods 62 supported by its housing 56. Another pair of base members 64 similar to base members 53 support upper spaced apart side-seal bars 65 and is also guided for vertical movement by guide rods 62. The side-seal bars 65 are similar to bars 54, and additionally have laterally extending locating projections 66 at one end cooperating with the lower bars to seal the webs therebetween and form stops for properly locating and positioning the leading end of the next sheet to be packaged. Each of the base members 53, 64 supports a rack 67, only one of which is shown, and one end of each rack is secured to its base member and the opposite end thereof passes through a guide member, not shown, supported by the opposite base member. The racks 67 face one another in spaced-apart relation and a pinion 68 rotatably mounted on a bar 69 rigidly secured to its base member is interposed between racks 67 in meshing engagement therewith. By this pinion-rack arrangement, vertical movement of spaced apart base members 53 and side-seal bars 54 in a vertical direction by means of air cylinder 36 causes a corresponding movement of the other spaced apart base members 64 and side-seal bars 65 in the opposite direction.

The cross-seal and transport mechanism 23 mentioned heretofore as seen best in FIGS. 3, 5, 8 and 9 comprises a front housing 80 having side frames 81 slidably mounted on rods 82 fixed to frame 21 and a projection 85 slidably mounted on rod 86 fixed to frame 21. A pinion 83 is rotatably supported by one of the side frames 81 and meshes with a gear rack 84 rigidly secured to frame 21. The upper end of front housing 80 further has a flange 89 at its upper end which is secured to one end of a piston rod 90, the piston rod 90 being a part of an air cylinder 91 secured to frame 21. A rear housing 87 having side frames 96 is spaced apart from front housing 80 and slidably mounted on rods 82, and the housings 80, 87 are rigidly secured together by tie rods 88 for movement together as a unit. It is clear that operation of air cylinder 91 in a well-known manner will move the housings 80, 87 in one direction or the other depending upon the operation of air cylinder 91. The transport portion of mechanism 23 comprises an upper drive roller 92 as seen in FIGS. 8 and 9 having one end fixed to a gear 93 rotatably mounted on a shaft 94, and its opposite end secured to shaft 94 for rotation therewith. One end of shaft 94 is rotatably supported by side frame 96, and the opposite end rotatably supported by a bracket 95 carried by housing 87. The opposite end is further pinned to a driven clutch element 97 of any known type of one-way spring clutch, and a pinion 98 in mesh with rack 84 is secured to a driving clutch element 99 which is connected to driven element 97 by a helical spring 100. The clutch operates to drivingly connect pinion 98 to drive roller 92 only when the cross-seal and transport mechanism 23 is moved to its start position. When the mechanism is moved from its start position to its end position, the clutch does not connect pinion 98 to drive roller 92 so that there is no movement of drive roller 92 with respect to the webs of paper which are interposed therebetween. An upper drive roller 101 and supporting structure spaced apart from roller 92 is identical thereto. A lower roller 102 below upper roller 92 is rotatably mounted for free rotation on a fixed shaft 103 carried by housing 87. A lower driven roller 104 below and in register with roller 101 has one end secured to a gear 105 in mesh with gear 93, and gear 105 and roller 101 are both rotatably mounted on a fixed shaft 106 supported by side frame 81 and housing 80. An upper belt 107 encircles upper rollers 92, 101 and a lower belt 108 encircles lower rollers 102, 104 and the upper and lower rollers are spaced apart from one another a sufficient distance so that the portions of the belt facing one another press webs 26 interposed therebetween together and form a guide and support means therefore. Since the gears 98 are in mesh with rack 84, movement of housings 80, 87 from their end position to their start position by means of cylinder 91 will drive upper rollers 92, 101 and belt 107 through their clutches 97, 99 and upper roller 101 will in turn drive roller 104 and belt 108 through gears 93, 105 for a purpose to be explained hereinafter.

The front housing further supports the cross-seal portion of mechanism 23 which comprises a flat anvil 109 having a longitudinally extending hard rubber insert 110 mounted therein as seen best in FIGS. 4 and 6. Mounted on anvil 109 is a guide bracket 111 having an elongated slot for reciprocally supporting an elongated cross-seal heating bar 112 comprising front and rear blocks 113, 114 respectively secured together, one of the blocks 114 having a resistance heating element 115 therein for heating bar 112. An insulation strip 116 is interposed between one side of bar 112 and guide bracket 111, and another insulation strip 117 is interposed between guide bracket 111 and a stationary knife blade 118 fixed to bracket 111 for minimizing transfer of heat from sealing bar 112 to guide bracket 111. Each end of the sealing bar 112 is secured by a pin 119 to one end of a rod 120 of an air clamp 121 of any known type. An electrically operated solenoid valve is connected to air clamp 121, and upon proper actuation thereof the air clamps 121 operate to reciprocally move cross-seal bar 112 toward or away from the hard rubber insert 110. The cross-seal bar 112 applies heat and pressure to the webs 26 for sealing together a portion of webs 26 extending transversely across the same end lying between two successive sheets, and for holding and transporting the webs forward a predetermined distance conforming to the size of the package to be formed upon movement of housings 80, 87 by air cylinder 91. Adjustable stop means, not shown, may be incorporated to control the distance the housings are advanced. The lower end of front housing 80 further supports respective front and rear brackets 122, 123 secured together to form an elongated groove therebetween. A movable knife blade 124 is mounted in the groove for reciprocal movement and has one side thereof secured to a knife holder 125 which is in turn secured by suitable linkage to an air clamp 126 similar to the aforementioned air clamps 121. The air clamp 126 is also connected to a solenoid valve 227 and is adapted upon actuation thereof to reciprocally move the knife blade 124 in the groove through the transversely sealed portion of webs 26 while mechanism 23 is in its end position as seen in FIG. 13. One side of the upper end of knife blade 124 cooperates with one side of fixed blade 118 to provide a cutting device for severing the superposed webs 26 of paper through the transversely sealed portion disposed between sealing bar 112 and anvil 109 for separating a completely sealed package from webs 26.

The pitch diameter and pitch of pinion 98 and the outside diameter of rollers 92, 101, 102, 104 are properly selected so that as cross-seal and transport mechanism 23 is moved by piston 91 back to its start position, no relative motion exists between the portion of belts 107, 108 in contact with the severed package which lies therebetween. As the mechanism 23 is returned to its rest position, the belts 107, 108 which are supporting the severed packages are moved into rolling engagement with webs 26 forming a part of the next succeeding package and withdrawn from the severed package without any relative movement therebetween, releasing said severed package which then drops into storage bin 35. During this return movement of the cross-seal and transport mechanism 23, the belts 107, 108 effectively squeeze or purge trapped air from the open end of the next succeeding package which has been previously sealed along two sides and one end.

The packaging machine 20 is further provided with a support means, shown best in FIGS. 1–3, for supporting the webs 26 when the cross-seal and transport mechanism 23 is moved from its start position to its end position. The support means comprises pairs of tensioned upper and lower glass cloth belts 127, 128, respectively whose ends are supported on fixed shafts 129, 130, 131 and 132 secured to frame member 21. The upper belts 127 are each supported intermediate its ends 129, 130 by free turning rollers 134, 135 carried by front housing 80. The lower belts 128 are each supported by similar free turning rollers 136, 137 also carried by housing 80. As housing 80 of mechanism 23 is moved from its start position to its end position, the belts 127, 128 are rolled into engagement with webs 26 by rollers 134, 136 for supporting same. As the mechanism 23 is returned to its start position, rollers 135, 137 withdraw respective belts 127, 128 from web 26.

The operation of this packaging machine 20 through a single cycle of operation during which a single sheet 34 of material is packaged will now be described with particular reference to FIGS. 10–17. By a cycle of operation, applicants mean the movement of mechanisms 22 and 23 of machine 20 from this start position through their operations and back to the start position once again. The packaging machine 20 passes through a cycle of operation for each sheet 34 being packaged. The operator initially closes a power switch 140 connecting the power supply to the packaging machine 20, assuming contacts 142 are closed which is the case if the control panel door, not shown, of machine 20 is closed properly. Immediately, the respective "power on" and "stacker" lamps 143, 144 are illuminated. The heat circuit timer 145 is energized and is timed to close contact 146 after approximately five seconds. Side seal heater relays 147, 148 are energized through normally closed contacts 147', 148' respectively, closing respective contacts 149, 150 to connect the power supply to side seal heaters 151, 152 and opening normally closed contacts 153, 154 respectively. Also, side seal relay 155 is energized opening normally closed contacts 156, 157. In addition, grid print valves 158, 159 are actuated for moving printing heads 30 out of engagement with webs 26 and into engagement with ink pads, not shown. Power is connected to a cross seal heater 160 through normally closed contact 161 and when heater 160 reaches a predetermined temperature, thermostat contact 162 is closed. The cross seal heater relay 163 is energized opening contacts 161, 164. A cross seal heat relay 165 and side seal heat relays 166, 167 are energized closing respective contacts 168, 169 and 170 connecting power to heat relay 171 and further closing respective contacts 172, 173 and 174 to hold in the relays. Heat relay 171 is energized closing contact 175, and further opening contact 175' turning off lamp 176' indicating that the heaters are up to temperatures. Also, a cross seal switch 176 is held by a control panel, not shown, of machine 20 in a position connecting the power to a cross seal timer 177 which closes contact 178 in approximately one second. The switch 176 is usable for trouble shooting and may be manually manipulated to connect power to a cross seal relay 179 for closing contact 180 and opening contact 180'. This energizes a solenoid operated cross seal travel valve 181 for moving the cross seal and transport mechanism 23 in increments at the will of the operator. The packaging machine 20 is at this time in a "rest" position, and in this position, the air cylinders 36, 91 respectively, are in their normal positions holding side-seal bars 54, 56 in an open position at one end of their travel, and the cross seal and transport mechanism 23 in a rest position in which the mechanism is at one end of its travel adjacent the entrance as seen in FIGS. 1 and 3. The mechanism 23 in this start position closes a normally open cross seal switch 182 energizing cross seal relay 183 which closes contact 184. Also, a grid print relay 185 is energized opening contact 186.

Figure 15:
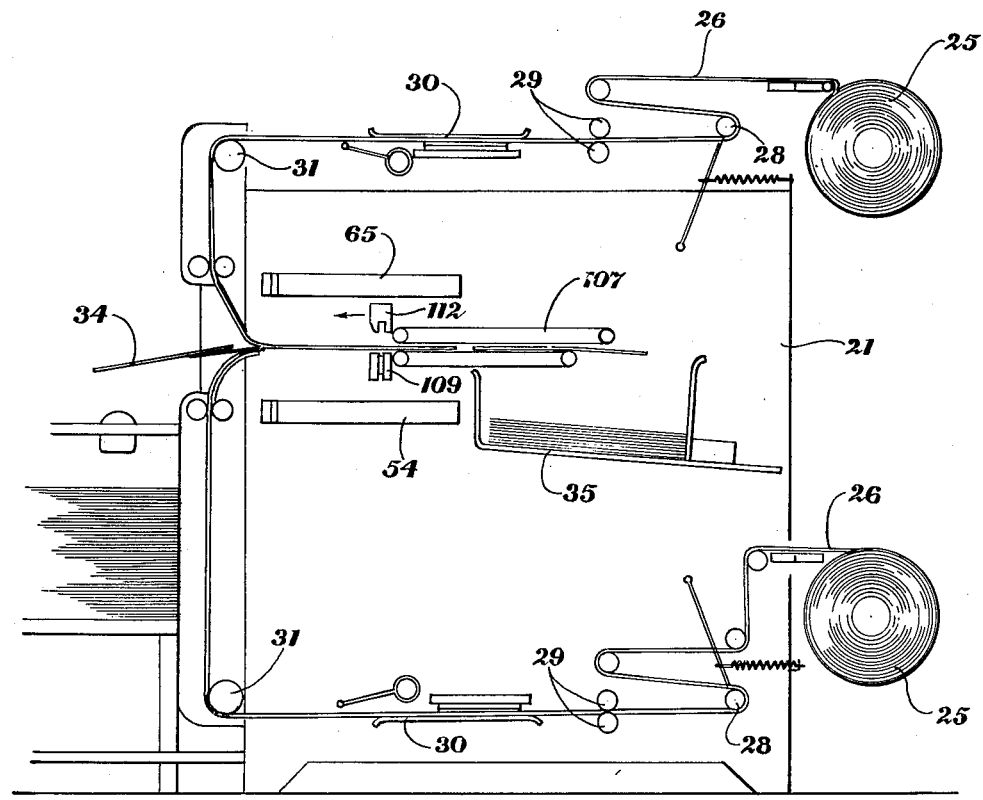

Let us assume that the operator has manually introduced webs 26 of paper in superposed relation through entrance 33 in machine 20 with the leading ends thereof moved past the cross-seal bar 112, and that machine 20 has gone through a cycle of operation and has returned to its start position. The operator manually introduces a sheet 34 of film or the like between paper webs 26 and against the locating stops formed by the side-seal bars 54, 65 during the previous cycle of operation, and then presses a button or foot pedal closing a start switch 187 to initiate another cycle of operation. As soon as switch 187 is closed, a cross seal relay 188 is energized closing contact 189. Cross seal relay 190 is energized closing contact 191 to hold in relay 190 and closing contact 192 in the cut off knife circuit. Also, a cross seal relay 193 is energized closing contact 194' and contact 194 for energizing a solenoid operated cross seal close valve 195 for moving cross seal bar 112 from its open position to a closed position as seen in FIG. 11 pressing the superposed webs 26 of paper against anvil 109 for sealing a portion of the webs transversely across same. As cross seal bar 112 reaches its closed position, cross seal switch 182 is opened deenergizing grid print relay 185 causing contact 186 to close. The cross-seal bar 112 is of a width sufficient to seal the trailing end of one package thereby completely sealing that package, three sides of which had been sealed during the previous cycle of operation, and the leading end of the next succeeding package in one sealing operation. A cross seal switch 196 is closed by cross seal bar 112 in its closed position energizing cross seal relay 197 which closes contact 198 to hold relay 197 in. Contact 198 is also closed energizing solenoid operated cross seal travel valve 181 causing air cylinder 91 to move the cross seal and transport mechanism 23 from its start position to an end position as seen in FIG. 12. In addition, a cross seal relay 199 is energized opening contact 200 shutting off the "Ready to Load" light. The cross seal bar 112 as it reaches its end position closes a normally open cross seal switch 210. A side seal timer 211 is energized closing contact 212 after a predetermined time period. A side seal relay 213 is energized opening contact 214 to turn off the "Ready to Load" lamp 215. A side seal relay 216 is energized closing contact 217. This energizes grid print relays 218, 219 closing contact 218' and opening respective contacts 220, 221 causing respective solenoid operated grid print valves 158, 159 to move grid printing heads 30 into engagement with web 26 for imprinting certain indicia thereon. Also a contact 222 is closed energizing a solenoid operated side seal valve 223 which moves side seal bars 54, 65 slowly into a closed position gripping webs 26 therebetween. As the side seal bars 54, 65 reach this closed position, a side seal switch 224 is closed energizing a solenoid operated side seal helper valve 225 for increasing to full live pressure the sealing pressure exerted upon webs 26. The side seal bars 54, 65 in the closed position close a side seal switch 226 energizing a solenoid operated cut-off valve 227 for moving knife blade 124 through the sealed portion of webs 26 severing the completed package therefrom. The machine 20 is in the position shown in FIG. 13. Also, cycle counters 228 of any known type are energized to count the number of cycles and hence the number of packages formed. A cross seal timer 229 is energized opening contact 230 after a time period of approximately 2 seconds. This deenergizes cross seal relays 190, 193 opening contact 194 causing cross seal valve 195 and air clamps 121 to move the cross seal bar 112 back to its open position. A side seal switch 231 which is held closed by side seal bars 54, 65 in their open position, is opened upon movement of side seal bars into their closed position deenergizing side seal relay 155 causing contact 156 to close. A side seal relay 232 is energized upon closing of contact 212 opening contact 233 and deenergizing side seal valve 158 which moves side seal bars 54, 65 back to their open position. The mechanisms 22, 23 are now in the position seen in FIG. 14. Also, a contact 234 is closed energizing a side seal relay 235 which opens contact 236. This deenergizes cross seal relay 197 causing contact 198 to open deenergizing cross seal valve 181 causing air cylinder 91 to move the cross seal and transport mechanism 23 back to its initial position as seen in FIG. 15. As soon as mechanism 23 starts back, cross seal switch 210 is opened deenergizing relay 216 and opening contact 217. This deenergizes the grid print relays 218, 219 permitting contacts 220, 221 to close energizing solenoid operated valves 158, 159 for withdrawing the printing heads 30 from the webs 26 and urging them into engagement with their ink pads.

The packaging machine 20 is further provided with safety features comprising a paper break relay 245 which is energized whenever a break occurs in the paper causing one of the switches 250, 251, 252 or 253 to close. Relay 245 causes contact 237 to close illuminating the "paper end" light 238, and opening contact 246 preventing further operation of machine 20. Also, the failure to have any of the guard and panel members in proper position opens one of the switches 254, 255, 256, 257, 258 or 259 deenergizing a guard relay 239 causing contact 240 to open whereupon pressure release valves 241, 242 allow air to escape from pistons 36, 91. In addition, if the control panel door, not shown, is not shut properly thereby opening a switch 243, a guard relay 244 is deenergized opening contacts 140 disconnecting the power to machine 20. The total time for completing a cycle of operation, and hence packaging a single sheet 34 of material is approximately 5 seconds. All of the cylinders 36, 91 and air clamps 121, 126 are operated in timed sequence by electric-pneumatic means which are shown diagrammatically and schematically in FIGS. 16 and 17.

Figure 16:
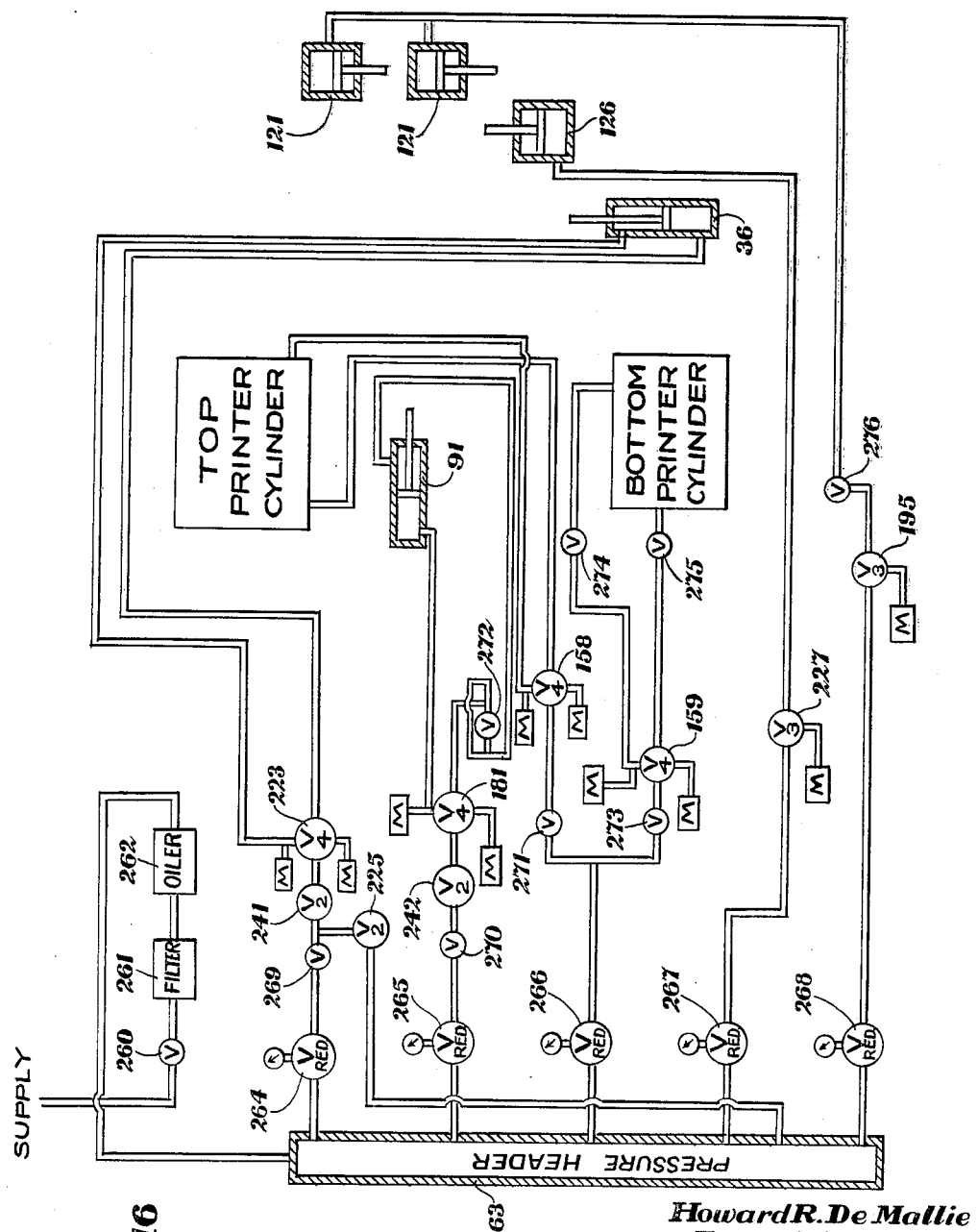
FIG. 16 is a diagrammatic view of the pneumatic system for the packaging machine.
Figure 17:
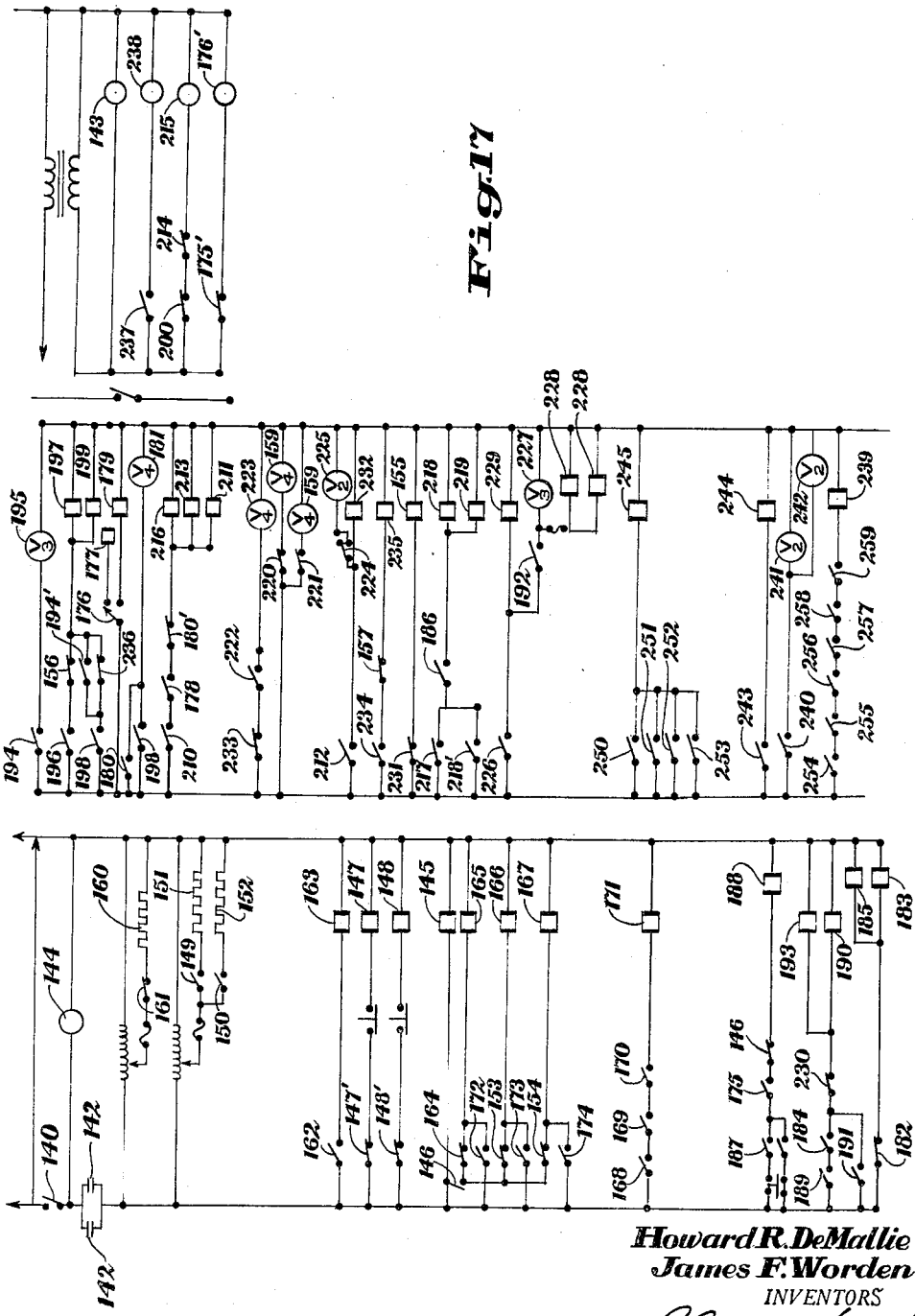
FIG. 17 is a schematic wiring diagram for the packaging machine.

With respect to the pneumatic system as seen in FIG. 16, the pressurized air is introduced from any suitable supply through a turn-off valve 260, filter 261 and oiler 262 into a pressure header 263. The air is supplied from header 263 to reducing valves 264, 265, 266, 267 and 268, and the air at a reduced pressure is supplied to the printer cylinders, not shown, side seal cylinder 36, cross seal travel cylinder 91, cross seal cylinders 121 and cut-off knife cylinder 126. The system is further provided intermediate the cylinders and reducing valves with commercially available Pneutrol flow control valves 269, 270, 271, 272, 273, 274, 275, and 276, cross-seal valves 181, 195, cut-off knife valve 227, grid print valves 158, 159, side seal valve 223 and pressure release valves 241, 242. Valves 195 and 227 are Skinner three-way valves Model V5–3, valves 158, 159, 181 and 223 are Beckett-Harcom four-way valves Model B–1, and valves 241, 242 are Humphrey two-way valves Model 350E–1. A helper valve 225 which is a Skinner two-way valve Model V5–2 is provided for by-passing reducing valve 264 and applying full line pressure to side seal cylinder 36 when the side seal bars reach their closed position.

This invention has been described in detail with particular reference to a preferred embodiment thereof, but it will be understood that variations and modifications can be effected within the spirit and scope of the invention as described hereinabove and as defined in the appended claims.

We claim:
1. In a machine for successively packaging individual sheets of material introduced in longitudinally spaced relation between superposed webs of sealable wrapping material which are wider than, and extend beyond the opposed sides of said sheets, the combination comprising: means movable from an inoperative position to an operative position in a first plane for gripping and sealing together a portion of said webs extending transversely across the same and lying between two successive sheets to transversely seal the trailing end of a first package containing a first sheet to complete the packaging of said first sheet, the two sides and other end of which had previously been sealed, and to transversely seal the leading end of a succeeding second package containing a second sheet; means including said gripping means movable in a direction transversely of said first plane for advancing said webs including said incompleted second package as well as said completed first package to a second plane spaced from and parallel to said first plane; means movable from an open position to a closed position for pressing and sealing together the sides of said webs extending beyond the opposed side of said second sheet so that said second package is sealed along two sides; means for severing said webs intermediate said transversely sealed portion for separating said completed first package from said partially completed package; means for returning said pressing means to its open position; means for moving said gripping means to its inoperative position in said second plane; and means for returning said advancing means from said second plane back to said first plane without moving said webs, said advancing means further including means adapted upon return of said advancing means to said first plane to remove air from said incompleted second package and to discharge said completed first package from said second plane.

2. The invention according to claim 1 wherein said gripping means comprises a reciprocal sealing bar movable to and from gripping relation relative to said webs.

3. The invention according to claim 2 wherein said advancing means comprises an anvil engageable by said sealing bar and between which those portions of said superposed webs lying between two successive sheets are adapted to be introduced.

4. The invention according to claim 3 wherein said pressing means comprises spaced apart pairs of oppositely disposed sealing members between which the sides of said webs which overhang the sides of said sheets are transported.

5. The invention according to claim 4 wherein said pressing means includes means for moving said sealing members toward and away from one another to seal and release, respectively the sides of said webs overhanging the sides of said sheet.

6. The invention according to claim 1 wherein said advancing means supports said severing means.

7. The invention according to claim 6 wherein said severing means comprises a reciprocally movable knife blade cooperating with a fixed blade.

8. The invention according to claim 1 wherein said air removing and package discharging means comprises oppositely disposed endless belts between which said webs are supported.

9. The invention according to claim 8 wherein said belts are driven in opposite directions only when said advancing means is returned from said second plane to said first plane.

10. The invention according to claim 9 wherein each of said belts is supported by a pair of rollers, and a roller supporting one of said belts is drivingly connected to a roller supporting the other of said belts, and at least one roller has a gear in driving engagement with a gear rack.

11. The invention according to claim 10 wherein the diameters of the rollers, and pitch and pitch diameter of the gears are properly selected so that the belts are rolled into engagement with the webs at the same speed as the advancing means is moved whereby there is no relative motion between the webs and the belts.

12. The invention according to claim 10 wherein a one-way clutch is interposed between said gear rack and gear connected thereto whereby said gear and roller are driven only when said advancing means is returned from said second plane to said first plane.

13. The invention according to claim 1 wherein said gripping means comprises a reciprocally movable sealing bar; said advancing means supports said severing means and comprises an anvil engageable by said sealing bar and between which said superposed webs are introduced; said severing means comprises a reciprocally movable knife blade cooperating with a fixed blade; said pressing means comprises spaced apart pairs of oppositely disposed sealing members between which said webs are transported; and said air removing and package discharging means comprises oppositely disposed endless belts between which said webs are supported, said belts being driven in opposite directions only when said advancing means is returned from said second plane to said first plane.

14. In a mechanism for discharging a completed package and purging air from the open end of a succeeding partially completed package formed from superposed webs of sealable wrapping material which are wider than and extend beyond the edges of the material being packaged, the partially completed package having been previously sealed along two sides and trailing end thereof, the combination comprising: means adapted in a first stationary position to support both sides of said partially completed package; means for sealing said partially completed package to form a completed package; means for advancing said support means and said completed package from said first stationary position to a second stationary position; means for sealing said webs adjacent said completed package while in said second position to form a partially completed package; means for returning said support means from said second position to a said first position into engagement with both sides of said partially completed package; and means for driving said support means during its movement to said first position causing said support means to release said completed package and to purge the air from said partially completed package.

15. The invention according to claim 14 wherein said support means comprises oppositely disposed endless belts.

16. The invention according to claim 15 wherein each of said belts is supported by a pair of rollers, and a roller supporting one of said belts is drivingly connected to a roller supporting the other of said belts, and at least one roller has a gear in driving engagement with a gear rack.

17. The invention according to claim 16 wherein the diameter of the rollers, and pitch and pitch diameter of the gears are properly selected so that the belts are rolled into engagement with the webs at the same speed as the returning means is moved whereby there is no relative motion between the webs and the belts.

18. The invention according to claim 16 wherein a one-way clutch is interposed between said gear rack and gear connected thereto whereby said gear and roller are driven only when said support means is returned from said second position to said first position.

19. In a method for successively packaging individual sheets of material between superposed webs of sealable wrapping material which are wider than, and extend beyond the opposed sides of said sheets, the steps comprising: introducing successive sheets of material in longitudinal spaced relation between said superposed webs; gripping and sealing together a portion of said webs held in a first stationary position, said portion extending transversely across said webs and lying between successive sheets to transversely seal the trailing end of a first package containing a first sheet to complete the packaging of said first sheet, the two sides and other end of which had previously been sealed, and to transversely seal the leading end of a succeeding adjacent second package containing a second sheet; transporting said webs including said incompleted second package and said adjacent completed first stationary package from said first position to a second stationary position; substantially simultaneously sealing together the longitudinally extending sides of said webs extending beyond the opposed sides of said second sheet and adjacent said transversely sealed portion, and severing said webs intermediate said transversely sealed portion for separating said first package from said adjacent partially completed package which is now sealed on its leading end and two sides while said webs are in said second stationary position; and substantially simultaneously purging the air from said partially completed package and discharging said adjacent completed package.

References Cited in the file of this patent

UNITED STATES PATENTS

| | | |
|---|---|---|
| 2,586,445 | Stalter | Feb. 19, 1952 |
| 2,919,990 | Podlesak et al. | Jan. 5, 1960 |
| 2,951,325 | Podlesak et al. | Sept. 6, 1960 |
| 2,978,008 | Conti | Apr. 4, 1961 |
| 3,011,294 | Pancratz | Dec. 5, 1961 |
| 3,022,618 | Schwartz et al. | Feb. 27, 1962 |

UNITED STATES PATENT OFFICE
CERTIFICATE OF CORRECTION

Patent No. 3,120,726                        February 11, 1964

Howard R. De Mallie et al.

It is hereby certified that error appears in the above numbered patent requiring correction and that the said Letters Patent should read as corrected below.

Column 10, line 25, for "first stationary package from said first position" read -- first package from said first stationary position --.

Signed and sealed this 29th day of September 1964.

(SEAL)
Attest:

ERNEST W. SWIDER                        EDWARD J. BRENNER
Attesting Officer                             Commissioner of Patents